Nov. 28, 1967   C. PROCHNOW   3,354,805
FOCUSING KNOB FOR PHOTOGRAPHIC CAMERAS
Filed May 27, 1965   2 Sheets-Sheet 1

Nov. 28, 1967  C. PROCHNOW  3,354,805
FOCUSING KNOB FOR PHOTOGRAPHIC CAMERAS
Filed May 27, 1965  2 Sheets-Sheet 2

United States Patent Office 3,354,805
Patented Nov. 28, 1967

3,354,805
FOCUSING KNOB FOR PHOTOGRAPHIC
CAMERAS
Claus Prochnow, Braunschweig, Germany, assignor to
Rollei-Werke Franke & Heidecke, Braunschweig, Germany, a firm of Germany
Filed May 27, 1965, Ser. No. 459,188
Claims priority, application Germany, July 8, 1964,
R 38,309
7 Claims. (Cl. 95—45)

ABSTRACT OF THE DISCLOSURE

A focusing knob for a photographic camera has a plurality of separate focusing scales for selective use with different lenses. One scale extends circumferentially around a cylindrical outer surface of a main section of the knob. Other scales extend around the cylindrical outer surfaces of annular sleeves concentric with the main section of the knob and in concentric nesting relation to each other. When the scale on the main section is to be used, the annular sleeves occupy a position offset axially from the scale on the main section and hidden within a masking rim. When a scale on one of the sleeves is to be used, that sleeve is moved axially from a position within the masking rim to a visible position overlying and obscuring the scale on the main section.

---

This invention relates to a focusing knob for photographic cameras or other photographic apparatus having a focusing movement controlled by a knob. In cameras or other photographic apparatus, it is often desirable to be able to change or exchange the focusing scale. For example, it may be desirable to have the scale marked in feet instead of meters, or vice versa. Or again, a differently graduated scale (whether in feet or in meters) may be needed if the lens is replaced in whole or in part by a different lens, or if a supplementary lens is added, or if certain types of supplementary filters are used.

An object of the invention is the provision of a generally improved and more satisfactory knob having a plurality of scales, any one of which may be rendered effective when desired.

Another object is the provision of a knob having a plurality of scales, so designed that any selected one of the scales may be rendered effective, and the others ineffective, by very simple and quick manipulation.

Still another object is the provision of such a knob so designed that each scale is not limited to one-half of the circumferential periphery of the knob, as in some prior constructions, but may extend through the entire circumference or any desired fraction thereof, thus enabling the present construction to be used where the full range of adjusting movement requires the knob to be turned through a full revolution or almost a full revolution, as distinguished from those knobs of the prior art whose scales could not give indications through more than one-half a revolution.

A further object is the provision of a knob with a plurality of selectively operable scales each capable of giving indications throughout a full revolution, in which all of the different scales are attached to the knob at all times, thus eliminating the need to carry separate scales for placing on the knob when desired, as in certain knobs of the prior art, and eliminating the danger of loss of separate scales when they are not being used on the knob.

A still further object is the provision of a knob with a plurality of scales, of simple and inexpensive construction, sturdy in use, and so designed that the scale members themselves can be readily stocked by a dealer and can be replaced in the knob assembly as required, thus providing, in the hands of a dealer, a great variety of different scale combinations from a relatively few stock parts, in addition to providing a plurality of quick changes of scale indication in the hands of the user, without any disassembly of parts.

These and other desirable objects may be attained in the manner disclosed as an illustrative embodiment of the invention in the following description and in the accompanying drawings forming a part hereof, in which.

Figure 1:
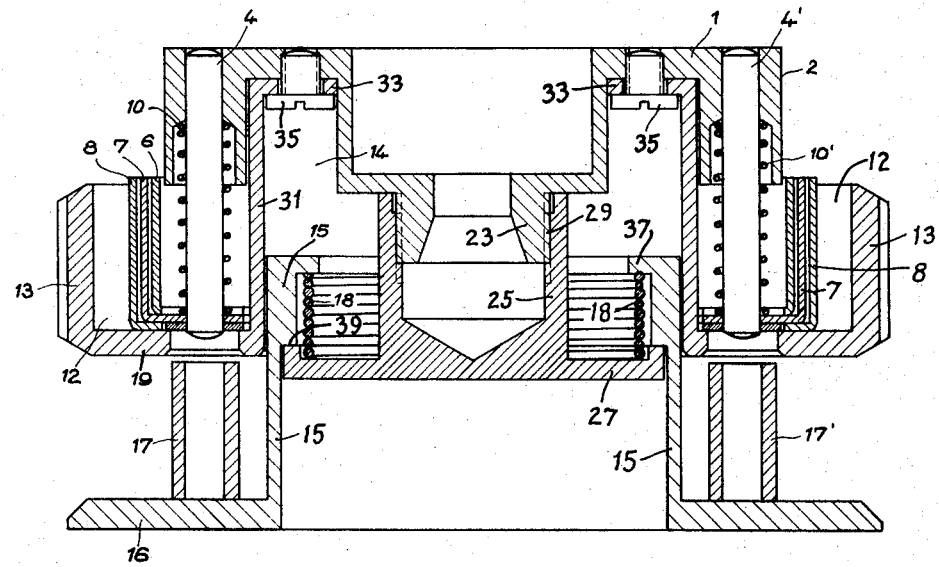
FIG. 1 is an axial section taken diametrically through a knob according to a preferred embodiment of the invention, with certain parts of the knob drawn apart ready to make a change from one scale to another.
Figure 2:
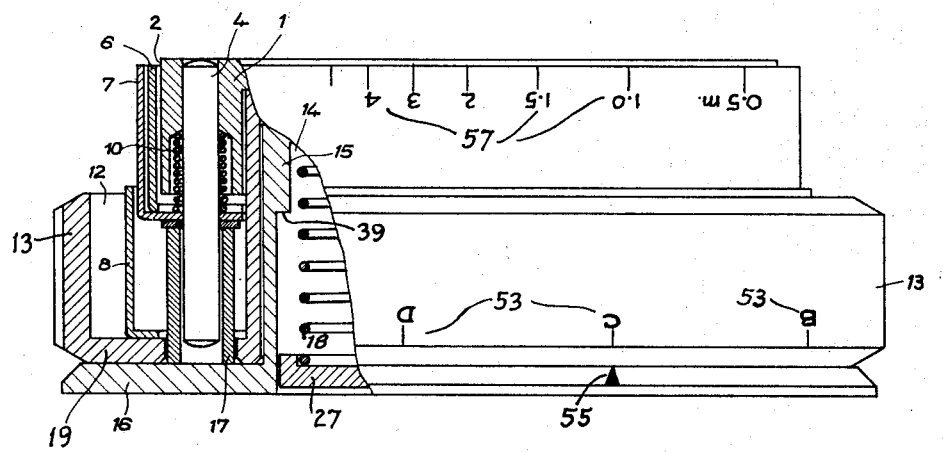
FIG. 2 is a view of the same knob partly in side elevation and partly in axial radial section, with the parts telescoped together ready for use with the intended one of the scales in effective operable position.

Referring now to the drawings, and at first to FIGS. 1 and 2, the knob of the present invention comprises a main body 1 having a cylindrical periphery 2 on which one of the desired focusing scales is circumferentially graduated. At the center of the body 1 is a rearwardly extending hub or projection 23, surrounded by the forwardly projecting hollow cylindrical portion 25 of a circular plate 27. Screw threads schematically shown at 29 fasten the parts 23 and 25 to each other.

Another component part of the knob comprises the rim 13 externally serrated for easy grasping and turning. Within the rim is a hollow space 12 for containing a plurality of scale members as further explained below. At the rear edge of the rim 13 there is an integral flange 19 which extends radially inwardly, and from the inner edge of this flange a cylindrical flange 31 extends forwardly, terminating in a small radial flange 33 which lies tight against a flat annular surface on the main body 1 and is held thereto by screws 35.

Except when the parts are purposely disassembled, the main body 1, 23 and the central parts 25, 27, and the rim parts 13, 19, 31, 33 are all fixed to each other and move together as a unit. This unit can move axially and can also rotate relative to the base unit comprising the cylindrical member 15 having at its rear end the outwardly extending radial base flange 16 which is secured by any suitable means (e.g., by screws, not shown) to the focusing arbor or shaft of the camera or other piece of photographic equipment with which the knob is to be used. At its forward end the cylindrical member 15 has a small inwardly extending radial flange 37 forming a lip for engaging the front end of the coiled compression spring 18, the rear end of which presses rearwardly on the front face of the flange 27 attached to the body member. Thus the spring 18 tends to draw the body parts rearwardly relative to the base parts and to keep the body parts seated in the normal position shown in FIG. 2, with the rear face of the flange 19 tight against the front face of the flange 16. But a forward axial pull exerted on the rim 13, sufficient to overcome the power of the spring 18, will move the body parts forward to the position shown in FIG. 1, this position being limited by engagement of the margin of the circular plate 27 with a rearwardly faced shoulder 39 on the member 15. It will be noted from FIG. 1 that the inside diameter of the flange 31 is slightly greater than the outside diameter of the flange 15, and the outside diameter of the flange 27 is slightly less than the inside diameter of that part of the flange 15 which is to the rear of the shoulder 39. The flange 15 thus forms a guide for guiding the forward and backward movements of the knob parts 1, 13, 23, 27, 31, etc.

In the space 12 within the rim 13 are a plurality of scale members arranged concentrically around each other. Three such members are shown, designated by the numerals 6, 7, and 8, but a greater or lesser number may be used. They may be described as dished members. Each has a cylindrical flange portion, with an inwardly extending radial flange at the rear end of the cylindrical flange. They are of a size to nest loosely with each other and with the periphery of the knob body 1. In other words, the inside diameter of the cylindrical flange of the first scale member 6 is slightly greater than the outside diameter of the knob body 1, the inside diameter of the cylindrical flange of the second scale member 7 is slightly greater than the outside diameter of the first scale member 6, the inside diameter of the cylindrical flange of the third scale member 8 is slightly greater than the outside diameter of the second scale membe 7, and so on, if more than three are used. With three scale members, there is room for four different focusing scales or scales of any other desired kind, one scale being graduated circumferentially around the cylindrical face 2 of the knob portion 1, the others being graduated circumferentially around the respective outer faces of the respective scale members 6, 7, and 8.

Fixed to the knob body portion 1 and extending rearwardly parallel to each other and to the rotary axis of the knob, are a series of pins. There are a plurality of pins, preferably two or three, associated with each one of the dished scale members, two such pins for each scale member being here illustrated. The total number of pins thus depends upon the number of scale members and the number of pins chosen for each scale member. With three scale members and with two pins for each scale member, as in the preferred construction, there are a total of six pins.

Figure 3:
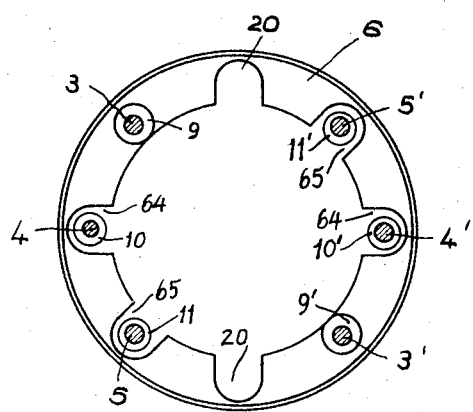
FIG. 3 is a detail plan of one of the scale members with associated pins in cross section, illustrating particularly the aperture arrangement on the base of this scale member.
Figure 4:
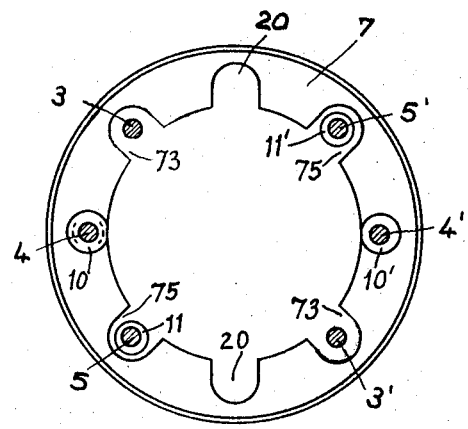
FIG. 4 is a similar plan of a second scale member.
Figure 5:
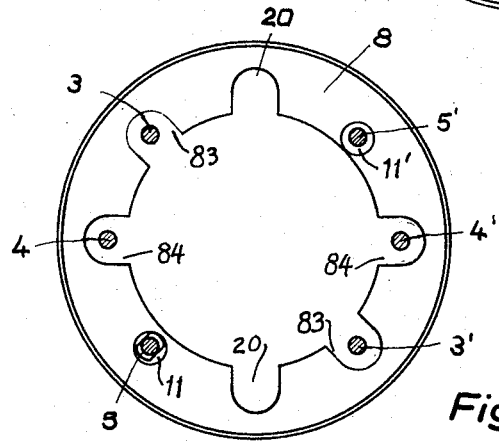
FIG. 5 is a similar view of a third scale member.

The two pins directly associated with each scale member extend slidably but fairly snugly through holes in the radial flange of the associated scale member and through enlarged recesses in the radial flanges of the other scale members. Referring here to FIGS. 3, 4, and 5, the pins 3 and 3' associated with the first scale member 6 extend snugly through holes in the radial flange of the member 6, but through large recesses 73 and 83 in the radial flanges of the other scale members 7 and 8. Similarly the pins 4 and 4' associated with the second scale member 7 extend snugly through holes in the radial flange of the member 7, but through large recesses 64 and 84 in the radial flanges of the other scale members 6 and 8. And the pins 5 and 5' associated with the third scale member 8 extend snugly through holes in the radial flange of the member 8, but loosely through large recesses 65 and 75 in the scale members. In addition to the recesses mentioned, there are large recesses 20 in the radial flanges of all three scale members 6, 7, and 8, as shown in FIGS. 3, 4, and 5.

Compression springs surround each pin, pressing rearwardly on the radial flange of the particular scale member associated with that pin, but having no effect on the other scale members, since the respective recesses in the other scale members are sufficiently large to give considerable clearance around each spring. The springs 9 and 9' surround the pins 3 and 3' and press rearwardly on the scale member 6. The springs 10 and 10' surround the pins 4 and 4' and pass with clearance through the recesses 64 in the scale member 6 and press rearwardly on the scale member 7. The springs 11 and 11' surround the pins 5 and 5' and pass with clearance through the recesses 65 and 75 in the scale members 6 and 7, and press rearwardly on the scale member 8. Thus the various springs tend to keep all three of the scale members in their rearmost positions, within the space 12 inside the rim 13, where the scale members, or at least their scale-bearing peripheries, are hidden from view.

For pushing the selected scale members forwardly to bring the desired scale into view, the base flange 16 is provided with a plurality of pusher members 17 and 17', preferably in the form of upstanding or forwardly extending tubes having their rear ends securely fixed to the flange 16, each tube having an inside diameter sufficiently large to receive any one of the pins 3, 3', 4, etc., and an outside diameter sufficiently small to pass freely through the various recesses 20, 64, 65, 75, etc. There are as many of these pusher tubes as there are pins associated directly with each scale member; thus if there are two pins for each scale member, as in the preferred construction, there are likewise two pusher tubes 17 and 17', located at the same radial distance from the center of rotation of the knob as the pins, and diametrically opposite each other, just as are the two companion pins associated with each one of the dished scale members.

The operation is quite simple, and any desired one of the scales can quickly be brought to effective operating or viewing position. To shift from one scale to another, it is only necessary to pull forwardly on the rim 13 or rearwardly on the base flange 16, moving them axially away from each other against the action of the spring 18 until the rear face of the flange 19 clears the front ends of the pusher tubes 17 and 17', as seen in FIG. 1, then turn the rim 13 and flange 16 relative to each other to an appropriate angular position of orientation, depending upon which particular scale is to be used, then release the forward pull so that the spring 18 restores the parts rearwardly to rest position with the flange 19 engaged with the flange 16, as seen in FIG. 2.

If it is desired to use the scale marked on the cylindrical surface 2 of the body 1, the parts are oriented (while pulled forwardly as above described) so that the pusher tubes 17 and 17' are alined with the recesses 20 in all of the scale members 6, 7, and 8. Then during the subsequent rearward movement of the front part of the knob assembly, the pusher tubes come up through the recesses 20 and do not displace any of the scale members, all of which remain in the space 12, in non-obstructing relation to the scale marked on the surface 2.

When the scale on the periphery of the scale member 6 is to be used, the parts are oriented (while the front part is pulled forwardly) to aline the tubes 17 and 17' with the pins 3 and 3' associated with the scale member 6. Then, upon the rearward movement, the tubes 17 and 17' will pass through the recesses 73 and 83 in the scale members 7 and 8, without affecting the position of these scale members, but will push forwardly on the radial flange of the scale member 6, causing this scale member to be projected forwardly out of the recess 12, to a position surrounding the cylindrical surface 2, hiding the scale on the surface 2 and making the scale on the member 6 visible. The entry of the pins 3 and 3' into the tubes 17 and 17' will couple all parts together for joint rotation when the knob is turned for focusing purposes.

Similarly, if the scale on the scale member 7 is the one which is to be used, the parts are turned (while pulled forward as in FIG. 1) to aline the tubes 17 and 17' with the pins 4 and 4' which are directly associated with the scale member 7 which is to be used. Upon subsequent rearward movement of the front part of the assembly, the pusher tubes will pass freely through the recesses 84 in the member 8 but will cause forward displacement of the scale member 7 to a visible position. The scale member 6 will likewise be displaced forwardly with the member 7, but this is of no moment, since the member 6 is surrounded and obscured by the member 7, whose scale is the only one visible. This is the situation specifically illustrated in FIG. 2.

If the scale member 8 is the one to be made effective, the parts are turned to aline the pins 5 and 5' with the pusher tubes, which will then push all three of the scale members forwardly. However, only the scale on the member 8 will be visible, the others all being surrounded and obscured by the member 8.

The user thus has the choice of four scales (or more, if more than three of the dished scale members are used), any one of which can be made effective or visible almost instantly, and all of which are permanently connected into a coherent assembly, with no loose or separate parts to be taken off and put on, with possibility of accidental loss while they are not being used.

The scales available on a single knob assembly according to the present invention are ordinarily ample for any one user, so that no disassembly and reassembly are needed, so far as the user is concerned. However, in the hands of the photographic equipment dealer, disassembly may be desirable in order to install a different set or series of the scale members or scale carriers 6, 7, and 8, with different scales thereon. The ease of disassembly and reassembly, and the ease of stocking a large selection of the scale carriers 6, 7, etc., at the factory and at the dealer establishment, for assembly into the knob structure when required, are important features of the invention. The member 25, 27 is simply unscrewed from the member 1, 23, whereupon the member 1, 23 may be completely removed from the base member 15, 16. This enables access to the rear face of the member 1, so that the screws 35 may be removed, enabling the member 1 and its pins 3, 4, 5 to be lifted off the member 13, 19, leaving the scale carriers 6, 7, 8 behind in the member 13, 19. The scale carriers are then removed and replaced by a new set of scale carriers with different scales marked thereon, and the structure is assembled in the reverse order from that above mentioned. The scale carriers are simple and inexpensive to make, so can be stocked in great variety by the factory and the dealer, at minimum expense.

When the structure is being adjusted to bring a fresh one of the scales into effective position, the proper orientation position to make any particuprlar focusing scale effective is shown by means of the index scale 53 (FIG. 2) on the rim 13, read in conjunction with the reference point 55 on the knob base 16. FIG. 2 also shows a typical focusing scale 57 such as might appear on the scale carrier 7, the other focusing scales on the other scale carriers being similar but with different graduations, of course.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A focusing knob for photographic cameras and the like, comprising a rotary base member, a rotary knob member mounted for axial displacement relative to said base member and also for rotation relative thereto when in one axial position, said knob member being non-rotatably coupled to said base member to turn therewith when in another axial position, a plurality of scale carriers mounted on one of said members, and means operated by a combination of axial movement and rotary movement of said knob member relative to said base member for moving a selected one of said scale members to effective operating position.

2. A focusing knob for photographic cameras and the like, comprising a rotary base member, a rotary knob member mounted for axial displacement relative to said base member and also for rotation relative thereto when in one axial position, said knob member being non-rotatably coupled to said base member to turn therewith when in another axial position, a plurality of scale carriers mounted on one of said members in concentric telescopic relation to each other, and means operated by a combination of axial movement and rotary movement of said knob member relative to said base member for moving a selected one of said scale members to effective operating position.

3. A focusing knob comprising a rotary body having a scale periphery with a focusing scale marked thereon, a plurality of supplementary scale carriers each in the form of a substantially cylindrical ring concentric with said scale periphery and with each other and a radial flange extending radially inwardly from one end of the cylindrical ring, all of the scale carriers being nestable with respect to each other and being axially movable with respect to said rotary body, spring means tending to maintain all of said scale carriers in nested position axially offset from said scale periphery so that a scale on said periphery may be visible, and means for moving any selected one of said scale carriers axially relative to said scale periphery to a position overlying and obscuring the scale on said scale periphery and rendering its own scale visible, the other scale carriers within the selected carrier, if any, moving axially with the selected carrier and remaining in nested relation thereto, and the other scale carriers outside of the selected carrier, if any, remaining in axially offset position with respect to the selected carrier and said scale periphery.

4. A construction as defined in claim 3, in which said means for moving a seelcted one of said carriers axially includes an axially movable pusher member adjustable to various positions circumferentially of the radial flanges on said scale carriers and a series of apertures formed in said radial flanges and so placed that said pusher member will make pushing engagement with thes radial flange of a scale carrier which is selected for axial displacement to effective position and will be alined with apertures in the radial flanges of other scale carriers not selected for displacement.

5. A construction as defined in claim 4, further including a plurality of sets of axially extending pins mounted on said rotary body, one set for each of said scale carriers, each set comprising a plurality of pins slidable snugly through holes in the radial flange of the particular scale carrier with which such pins are directly associated and passing loosely through apertures in the radial flanges of the other scale carriers, and a coiled spring surrounding each pin and pressing upon the particular scale carrier with which the pin is associated and passing loosely through the apertures in any intervening scale carriers.

6. A construction as defined in claim 5, in which said pusher member is a tubular member adapted to be brought into alinement with a pin associated with the particular scale carrier selected, and adapted to receive such pin within the tubular member.

7. A construction as defined in claim 6, further including scale means to assist in alining said tubular member with the desired pin.

References Cited

UNITED STATES PATENTS 2,897,739  8/1959  Gebele _____ 95—45
2,926,579  3/1960  Gebele _____ 95—45

JOHN M. HORAN, *Primary Examiner.*